(12) United States Patent
Vossman et al.

(10) Patent No.: US 6,351,941 B1
(45) Date of Patent: Mar. 5, 2002

(54) METHODS AND APPARATUS FOR REDUCING THERMAL STRESSES IN AN AUGMENTOR

(75) Inventors: Mark L. Vossman, Mason; Larry L. Vacek, West Chester, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/515,170

(22) Filed: Feb. 29, 2000

(51) Int. Cl.[7] ................................................. F02K 3/10
(52) U.S. Cl. ......................................................... 60/261
(58) Field of Search ................................ 60/39.11, 261, 60/749

(56) References Cited

U.S. PATENT DOCUMENTS

| | | | |
|---|---|---|---|
| 3,295,325 A | * 1/1967 | Nelson | 60/261 |
| 3,646,763 A | * 3/1972 | Arand | 60/261 |
| 3,800,527 A | 4/1974 | Marshall et al. | |
| 4,064,691 A | * 12/1977 | Nash | 60/261 |
| 4,312,599 A | 1/1982 | Darolia | |
| 4,380,899 A | * 4/1983 | Davies | 60/261 |
| 4,438,626 A | 3/1984 | Berestecki | |
| 4,594,851 A | 6/1986 | Kushnick et al. | |
| 5,179,832 A | 1/1993 | Barcza et al. | |
| 5,483,793 A | * 1/1996 | Weinstein et al. | 60/261 |
| 5,560,198 A | * 10/1996 | Brewer et al. | 60/261 |

FOREIGN PATENT DOCUMENTS

DE 956898 1/1957

OTHER PUBLICATIONS

European Search Report for Application No. 00311533.4–2315–; Jul. 25, 2001; European Patent Office.

* cited by examiner

Primary Examiner—Michael Koczo
(74) Attorney, Agent, or Firm—Andrew C. Hess; Rodney M. Young

(57) ABSTRACT

An augmenter includes an insert which reduces thermal stresses caused by hot combustion gases impinging the augmentor. The augmentor also includes a plurality of radial flameholder gutters and at least one outer circumferential flameholder connected to the radial flameholders to form a radial cap. The insert is contoured to conform to the radial cap and is attached to the radial cap. The insert shields the radial cap and includes a top surface, a bottom surface, and a plurality of openings extending therebetween. The openings permit the insert to be attached to the radial cap.

20 Claims, 3 Drawing Sheets and circumferential flameholders. Such flameholders include V-shaped gutters used for sustaining combustion during gas turbine engine reheat operations. The radial flameholders intersect the circumferential flameholders and form a radial cap which extends circumferentially around the augmentor.

During operation, hot combustion gases exit the core engine and are mixed with airflow exiting the bypass ducts. Fuel is introduced to the mixture and the fuel/air mixture is ignited producing hot combustion gases used for thrust. Hot combustion gases may travel radially outward through the augmentor radial flameholders and impinge upon the radial cap. As a result of hot combustion gases, thermal distress develops within the radial cap which reduces the useful life of the flameholders. Specifically, because of the exposure to the hot combustion gases, the radial cap may experience thermal creep and erosion. Furthermore, because of cooler air introduced to the augmentor from the bypass ducts, thermal gradients develop within the flameholders which often lead to LCF cracking at trailing edges of the flameholders.

BRIEF SUMMARY OF THE INVENTION

In an exemplary embodiment, an augmenter for a gas turbine engine includes an insert to reduce potential thermal stresses caused by hot combustion gases impinging components within the augmentor. The augmentor also includes a plurality of radial flameholder gutters and at least one outer circumferential flameholder connected to the radial flameholders to form a radial cap. The radial cap includes an upper and lower surface and extends circumferentially within the augmentor. The insert is contoured to conform to the radial cap. The insert is attached to the radial cap and includes a top surface, a bottom surface, and a plurality of openings extending therebetween. The openings permit the insert to be attached to the radial cap.

As the gas turbine is operated, the augmentor is exposed to airflows exiting a core engine and bypass ducts. Hot combustion gases exiting the core engine flow radially outward along the radial flameholders towards the radial cap. The insert prevents the hot combustion gases from impinging on the radial cap. As a result, thermal creep and erosion within the radial cap are reduced. Furthermore, because the insert extends further downstream than the circumferential flameholders, cracking at circumferential flameholder downstream edges due to low cycle fatigue, LCF, is reduced.

DETAILED DESCRIPTION OF THE INVENTION

Figure 1:
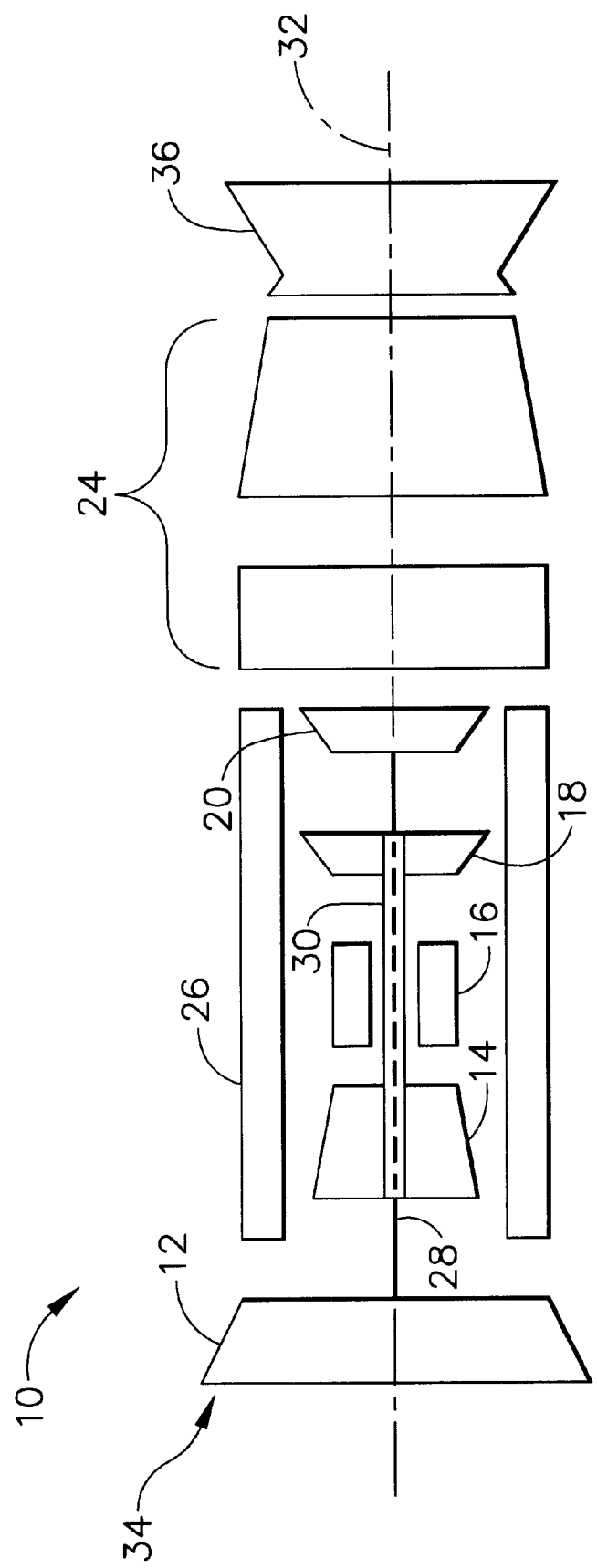
FIG. 1 is a schematic illustration of a gas turbine engine including an augmentor.

FIG. 1 is a schematic illustration of a gas turbine engine 10 including a low pressure compressor 12, a high pressure compressor 14, and a combustor 16. Engine 10 also includes a high pressure turbine 18, a low pressure turbine 20, an augmentor 24, and a bypass duct 26. Compressor 12 and turbine 20 are coupled by a first shaft 28, and compressor 14 and turbine 18 are coupled by a second shaft 30. Engine 10 has an axis of symmetry 32 extending from an inlet side 34 of engine 10 aftward to an exhaust nozzle 36 of engine 10. In one embodiment, engine 10 is an F110 engine available from General Electric Aircraft Engines, Cincinnati, Ohio.

In operation, air flows through low pressure compressor 12 and compressed air is supplied from low pressure compressor 12 to high pressure compressor 14. Highly compressed air is then delivered to combustor 16 and airflow from combustor 16 drives turbines 18 and 20. Airflow enters augmentor 24 from turbine 20 and from bypass duct 26. Augmentor 24 re-ignites the airflow and channels the airflow aftward to engine exhaust nozzle 36 of engine 10.

Figure 2:
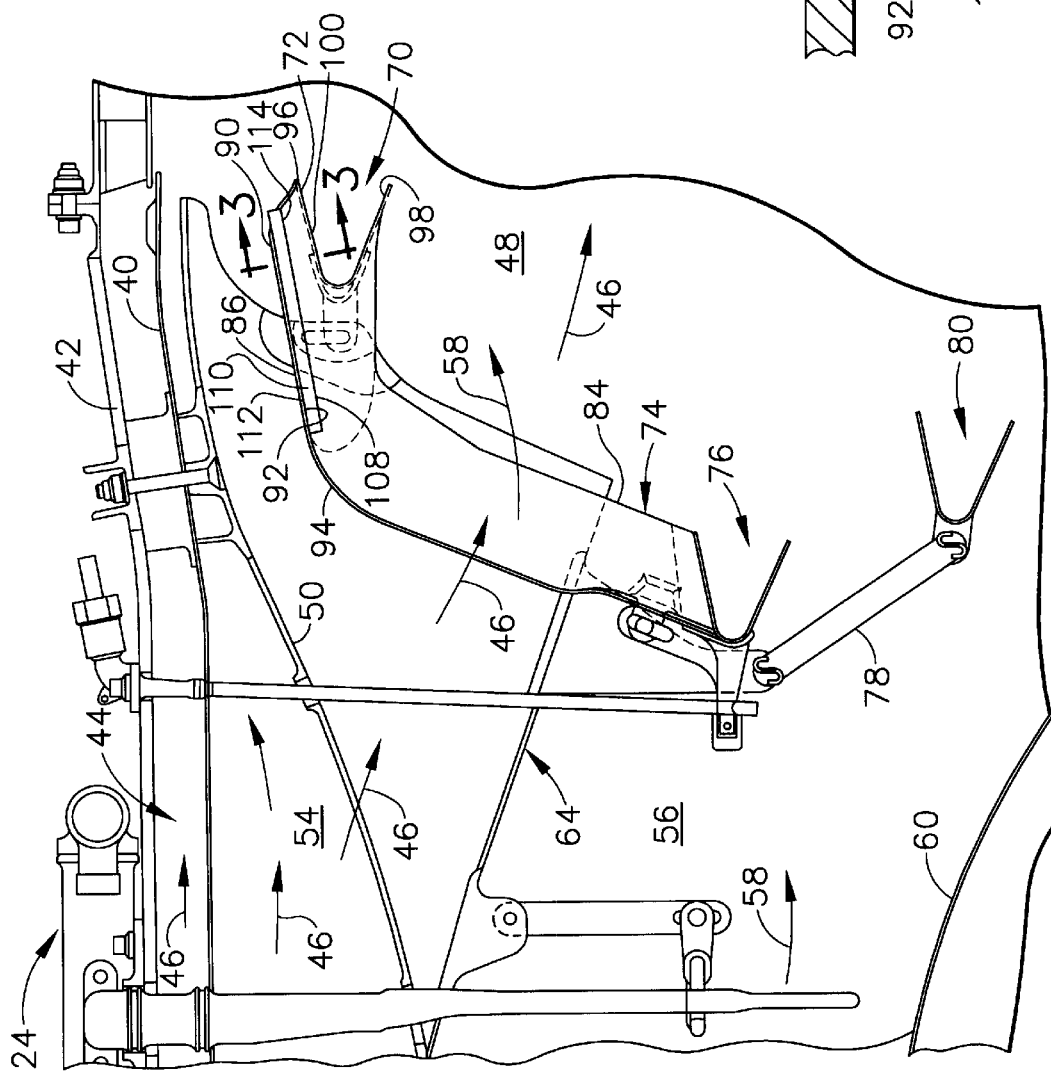
FIG. 2 is an enlarged cross-sectional view of a portion of the augmentor shown in FIG. 1.

FIG. 2 is an enlarged cross-sectional view of a portion of augmentor 24. Augmentor 24 includes an annular combustion or exhaust liner 40 spaced radially inwardly from an exhaust causing 42. Exhaust casing 42 extends from augmentor 24 to engine exhaust nozzle 36. A cooling duct 44 is formed between exhaust casing 42 and combustion liner 40. Cooling duct 44 is in fluid communication with bypass duct 26 and receives a portion of bypass fan air 46 exiting bypass duct 24. Combustion liner 40 also defines an augmentor combustion zone 48 disposed radially inward from combustion liner 40.

An annular diffusion mixer 50 is disposed radially inward from exhaust casing 42. Diffusion mixer 50 and exhaust casing 42 define an annular outer inlet 54 for receiving bypass fan air 46. Diffusion mixer 50 also defines an annular inner inlet 56 for receiving engine core gasflow 58 from a core outlet (not shown) of engine 10. Engine 10 also includes a centerbody 60 extending from the engine core outlet partially into augmentor 24. Centerbody 60 and diffusion mixer 50 decrease a velocity of engine core airflow 58 entering augmentor 24. A plurality of mixer chutes 64 extend radially inward from diffusion mixer 50 into diffusion area 56. Mixer chutes 64 are located circumferentially around augmentor 24.

Augmentor 24 also includes an outer circumferential or ring flameholder 70 disposed downstream from centerbody 60. Circumferential flameholder 70 is annular and includes a V-gutter 72. Circumferential flameholder 70 is connected to a plurality of radial flameholders 74 spaced circumferentially around augmentor 24. Radial flameholders 74 extend radially inward and upstream between outer circumferential flameholder 70 and an inner circumferential flameholder 76. A support assembly 78 extends radially inward from mixer chute 64 to a third circumferential flameholder 80. Individual mixer chutes 64 are disposed between respective pairs of radial flameholders 74.

Radial flameholders 74 include a radial V-Gutter 84 and connect to circumferential flameholder 70 to form a radial cap 86. Radial cap 86 extends circumferentially around augmentor 24 and is disposed radially inward from annular diffusion mixer 50. Radial cap 86 includes an upper surface 90 and a lower surface 92. Radial flameholders 74 include an elbow 94 which extends between radial cap 86 and radial V-gutter 84. Radial cap 86 extends from elbow 94 to a downstream edge 96 of circumferential flameholder 70. Circumferential flameholder V-Gutter 72 includes an inner wall 98 and an outer wall 100. Outer wall 100 is disposed radially outward from inner wall 98 and extends from inner wall 98 to circumferential flameholder downstream edge 96.

An insert 108 is attached to radial cap lower surface 92 and includes a body 110 including a top surface 112, a bottom surface 114, and a plurality of openings (not shown in FIG. 2) extending therebetween. Insert top surface 112 is contoured to conform to radial cap lower surface 92 and the openings are sized to permit fasteners (not shown in FIG. 2) to secure insert 108 against radial cap 86 such that insert top surface 112 is flush against radial cap lower surface 92. Insert 108 is fabricated from a material (not shown) that is more durable than a material used in fabricating flameholders 70 and 74. In one embodiment, insert 108 is fabricated from a composite silicone nitride material.

During operation, engine core gasflow 58 and bypass fan air 46 enters augmentor 24. Mixer chutes 64 channel bypass fan air 46, which is cooler than engine core gasflow 58, radially inward towards engine centerline 30 for mixing with engine core gasflow 58. Fuel is injected into engine core gasflow 58 and channeled into combustion zone 48 wherein the fuel/air mixture is ignited. Hot combustion gases travel radially outward along radial flameholder V-gutters 84 towards radial cap 86, but insert 108 prevents the hot combustion gases from impinging on radial cap lower surface 92, thus reducing thermal creep and erosion within radial cap 86.

Figure 3:
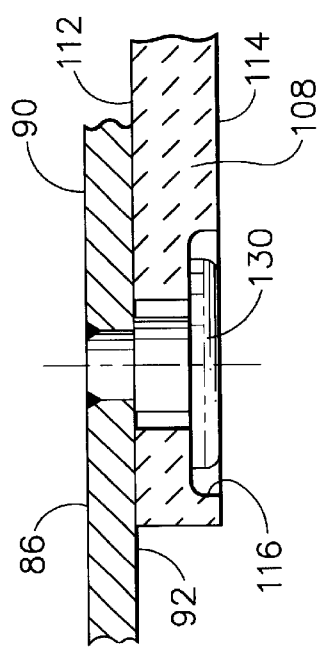
FIG. 3 is a cross-sectional view of a portion of the augmentor shown in FIG. 2 taken along area 3.
Figure 4:
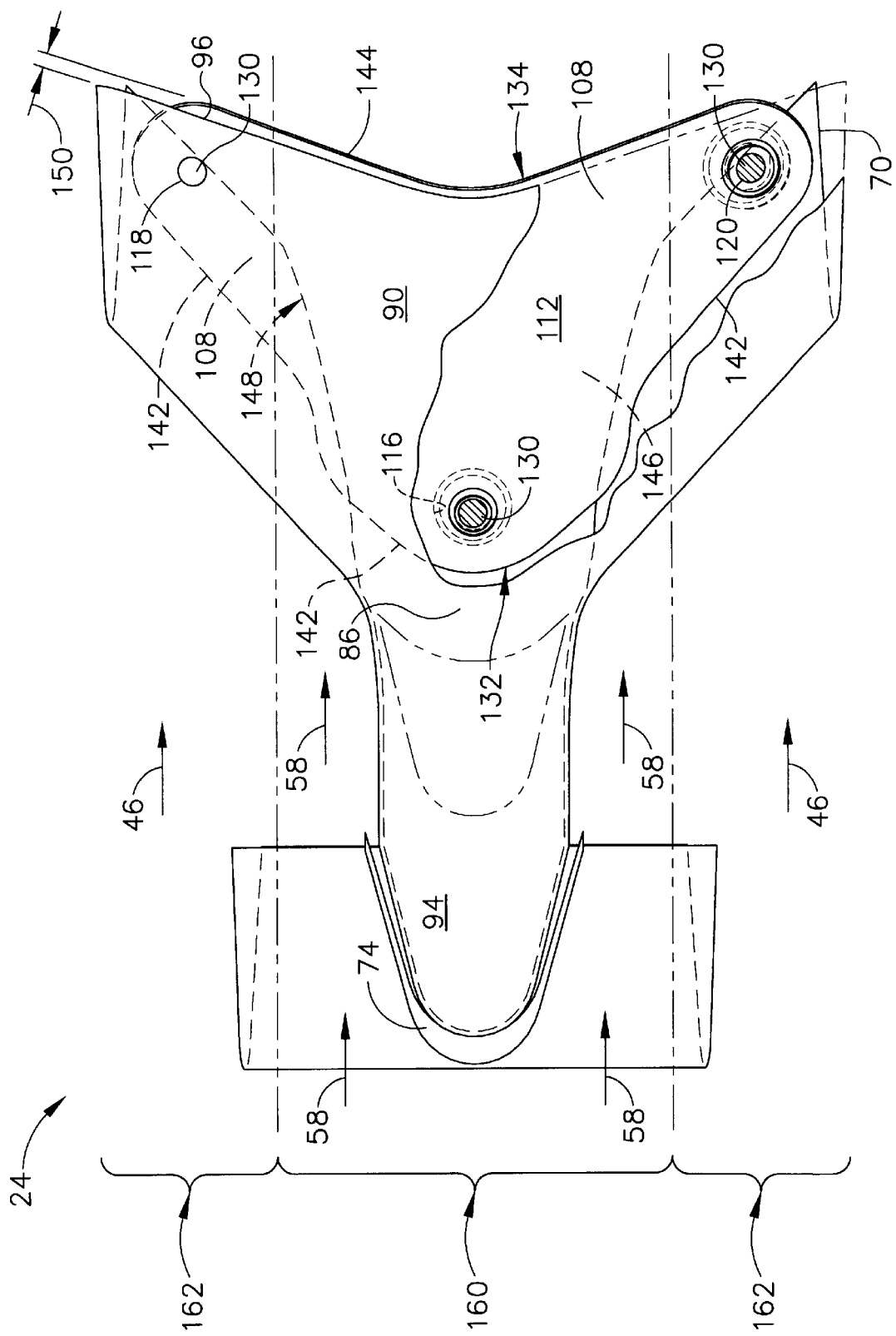
FIG. 4 is a plan view of a portion of the augmentor shown in FIG. 2 taken along area 4.

FIG. 3 is a cross-sectional view of a portion of augmentor 24 and FIG. 4 is a plan view of a portion of augmentor 24 including outer circumferential flameholder 70 and radial flameholder 74. Circumferential flameholder 70 and radial flameholder 74 are attached at radial cap 86. Radial cap 86 extends circumferentially around augmentor 24 and extends between radial flameholder elbow 94 and circumferential flameholder downstream edge 96. Radial cap upper surface 90 and lower surface 92 (shown in FIG. 2) are curved to permit radial cap 86 to extend circumferentially around augmentor 24.

Insert 108 is attached to radial cap 86 and includes top surface 112. Insert top surface 112 is contoured to conform to radial cap lower surface 92 such that when insert 108 is secured to radial cap 86, insert top surface 112 is substantially flush against radial cap lower surface 92. Insert 108 includes three openings 116, 118, and 120 sized to receive fasteners 130 for securing insert 108 to radial cap 86 with single point attachments. Such single point attachments minimize thermal stresses that may occur if multiple point attachments were used to secure insert 108 to radial cap 86. Opening 116 is adjacent an upstream side 132 of insert 108 and is upstream from openings 118 and 120 which are adjacent a downstream side 134 of insert 108. In one embodiment, fasteners 130 are welded pins. In another embodiment, fasteners 130 are riveted pins. Insert bottom surface 114 is counter-bored to permit a retainer-spacer (not shown) to be inserted circumferentially around each insert opening 116, 118, and 120. After fasteners 130 have secured insert 108 to radial cap 86, the heads of fasteners 130 are coated with an oxidation/erosion resistive material. In one embodiment, the oxidation/erosion resistive material is a bond coat material available from Allison Surface Technology, Hebron KY.

Insert 108 also includes a first contoured edge 142, a second contoured edge 144, and body 110. First contoured edge 142 connects to second contoured edge 144 such that first contoured edge 142 and second contoured edge 144 form a continuous perimeter 148 circumscribing insert body 110. Second contoured edge 144 is downstream from first contoured edge 142 such that when insert 108 is secured to radial cap 86, insert second contoured edge 144 overlaps circumferential flameholder downstream edge 96 and extends a distance 150 downstream from circumferential flameholder downstream edge 96. In one embodiment, distance 150 is approximately 0.060 inches.

During operation, engine core gasflow 58 enters augmentor 24 such that radial flameholders 74 are exposed to engine core gasflow 58. Mixer chutes 64 channel bypass fan air 46 to augmentor 24 such that bypass fan air 46 flows initially concentrically with respect to engine core gasflow 58. Accordingly, a portion 160 of insert body 110 is subjected to engine core gasflow 58 and a portion 162 of insert body 110 is exposed to bypass fan air 46. Opening 116 is disposed within insert body portion 160 and is exposed to engine core gasflow 58 and openings 118 and 120 are disposed within insert body portion 162 are exposed to bypass fan air 46. As hot combustion gases travel radially outward along radial flameholder V-gutters 84 towards radial cap 86, insert 108 prevents the hot combustion gases from impinging on radial cap 86. As a result, thermal creep and erosion within radial cap 86 are reduced. Furthermore, because fasteners 130 attach to radial cap 86 through insert openings 118 and 120, these specific fasteners 130 are exposed to bypass fan air 46 which is cooler than engine core gasflow 58 and as a result, thermal fatigue and creep within these fasteners 130 is reduced. Additionally, because insert second contoured edge 144 overlaps circumferential flameholder downstream edge 96 and extends a distance 150 downstream from circumferential flameholder downstream edge 96, cracking at circumferential flameholder downstream edge 96 due to low cycle fatigue, LCF,is reduced.

The above-described insert is cost-effective and highly reliable. The insert is secured to the radial cap with a plurality of single point attachments and is contoured to conform to the lower surface of the radial cap. The insert shields the radial cap from hot combustion gases which flow along the radial gutters towards the radial cap. As a result, an insert is provided which permits an augmentor to operate with a longer operating life.

While the invention has been described in terms of various specific embodiments, those skilled in the art will recognize that the invention can be practiced with modification within the spirit and scope of the claims.

What is claimed is:

1. A method of assembling an augmentor, the augmentor including a plurality of radial flameholder gutters, at least one outer circumferential flameholder gutter, and an insert, an outer circumferential flameholder connected to the radial flameholder gutters to form a radial cap, the radial cap including an upper surface and a lower surface, the insert including a body contoured to conform to the radial cap lower surface, the insert body including a top surface, a bottom surface, and a plurality of openings extending therebetween, said method comprising the steps of:

extending fasteners through the insert body plurality of openings; and attaching the insert to the radial cap with the fasteners.

2. A method in accordance with claim 1 wherein the insert body top surface conforms to the radial cap lower surface, the insert body further includes a first contoured edge connected to a second contoured edge, the first contoured edge upstream from the first contoured edge, the plurality of openings includes three openings, a first opening upstream from a second and a third opening, said step of attaching the insert further comprising the steps of:

extending a plurality of fasteners through the insert body three openings; and attaching the insert to the radial cap such that the insert body top surface is adjacent the radial cap lower surface.

3. A method in accordance with claim 2 wherein a portion of the radial cap is in fluid communication with bypass airflow and a portion of the radial cap is in fluid communication with engine core gasflow, said step of attaching the insert further comprising the steps of:

positioning the insert such that the second and third openings are in fluid communication with bypass airflow and the first opening is in fluid communication with engine core gasflow;

attaching the insert to the radial cap with welded pin fasteners, each of which includes a head; and coating the welding pin fastener heads with an oxidation/erosion coating.

4. A method in accordance with claim 2 wherein a portion of the radial cap is in fluid communication with bypass airflow and a portion of the radial cap is in fluid communication with engine core gasflow, said step of attaching the insert further comprising the steps of:

positioning the insert such that the second and third openings are in fluid communication with bypass airflow and the first opening is in fluid communication with engine core gasflow;

attaching the insert to the radial cap with riveted pin fasteners, each of which includes a head; and coating the riveted pin fastener heads with an oxidation/erosion coating.

5. An augmentor insert comprising a body comprising a top surface, a bottom surface, and a plurality of openings extending therebetween, said plurality of openings configured to receive a plurality of fasteners configured to secure said insert to an augmentor flameholder, said top surface contoured to conform to the augmentor flameholder, said insert configured to shield at least a portion of the augmentor flameholder from hot combustion gases.

6. An augmentor insert in accordance with claim 5 wherein the augmentor flameholder includes a radial cap, said insert body top surface contoured to conform to an outer surface of the radial cap, said insert configured to shield the radial cap from hot combustion gases.

7. An augmentor insert in accordance with claim 6 wherein the flameholder radial cap includes an upper surface and a lower surface, said insert body top surface contoured to conform to the lower surface of the flameholder radial cap.

8. An augmentor insert in accordance with claim 7 wherein said body further comprises a first contoured edge and a second contoured edge, said first contoured edge connected to said second contoured edge and upstream from said second contoured edge.

9. An augmentor insert in accordance with claim 8 wherein said body is configured to mount flush against the augmentor flameholder radial cap such that said second contoured edge extends downstream from a downstream side of the flameholder.

10. An augmentor insert in accordance with claim 9 wherein said plurality of openings comprises three openings.

11. An augmentor insert in accordance with claim 10 wherein a portion of the augmentor flameholder is in fluid communication with core engine gasflow and a portion of the flameholder is in fluid communication with bypass airflow, said three openings comprise a first opening, a second opening, and a third opening, said first opening and said second opening aft of said third opening, said third opening in fluid communication with the core engine gasflow.

12. An augmentor insert in accordance with claim 11 wherein said first and second openings are in fluid communication with the bypass airflow, said insert is fabricated from a silicon nitride material.

13. An augmentor for a gas turbine engine, said augmentor comprising:

a plurality of radial flameholder gutters;

at least one outer circumferential flameholder gutter connected to said radial flameholder gutters and forming a radial cap, said radial cap comprising an upper surface and a lower surface;

an insert attached to said flameholder radial cap, said insert comprising a body contoured to conform to said radial cap lower surface, said body comprising a top surface, a bottom surface, and a plurality of openings extending therebetween, said openings configured to receive a plurality of fasteners configured to secure said insert to said radial cap.

14. An augmentor in accordance with claim 13 wherein said insert top surface is contoured to conform to said radial cap lower surface.

15. An augmentor in accordance with claim 14 wherein said insert body further comprises a first contoured edge and a second contoured edge, said first contoured edge upstream from said second contoured edge and connected to said second contoured edge.

16. An augmentor in accordance with claim 15 wherein said insert body is mounts flush against said radial cap such that said radial cap second contoured edge extends downstream from a downstream side of said outer circumferential flameholder.

17. An augmentor in accordance with claim 16 wherein said insert body plurality of openings comprises three openings.

18. An augmentor in accordance with claim 17 wherein a portion of said insert body is in fluid communication with core engine gasflow and a portion of said insert body is in fluid communication with bypass airflow, said insert three openings comprise a first opening, a second opening, and a third opening, said first opening and said second opening aft of said third opening.

19. An augmentor in accordance with claim 18 wherein said insert first and said second openings are in fluid communication with bypass airflow, said third opening in fluid communication with core engine gasflow.

20. An augmentor in accordance with claim 19 wherein said insert is fabricated from a silicon nitride material.

* * * * *

UNITED STATES PATENT AND TRADEMARK OFFICE
CERTIFICATE OF CORRECTION

PATENT NO. : 6,351,941 B1
DATED : March 5, 2002
INVENTOR(S) : Mark L. Vossman et al.

It is certified that error appears in the above-identified patent and that said Letters Patent is hereby corrected as shown below:

Column 6,
Line 45, delete "body is mounts" and insert therefor -- body mounts --.

Signed and Sealed this

Twelfth Day of August, 2003

JAMES E. ROGAN
*Director of the United States Patent and Trademark Office*